(12) United States Patent
Chen et al.

(10) Patent No.: US 6,507,919 B1
(45) Date of Patent: Jan. 14, 2003

(54) METHOD OF AUTOMATICALLY SIMULATING BOOSTING THE ITEMS OF A WINDOWS MENU AND EXAMINING THE ITEMS

(75) Inventors: Tong-S Chen, Taipei (TW); Kuang-Shin Lin, Taipei (TW); Peng Li, Tientsin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/480,683

(22) Filed: Jan. 11, 2000

(51) Int. Cl.$^7$ ................................................ G06F 11/00
(52) U.S. Cl. ......................................... 714/38; 345/332
(58) Field of Search ............................... 714/38, 39, 41, 714/47, 46, 26; 345/326, 332, 348, 358

(56) References Cited

U.S. PATENT DOCUMENTS

| | | | | |
|---|---|---|---|---|
| 5,566,295 A | * | 10/1996 | Cypher et al. | ............... 395/161 |
| 5,590,330 A | * | 12/1996 | Coskun et al. | ............... 395/704 |
| 5,600,789 A | * | 2/1997 | Parker et al. | ........... 395/183.14 |
| 5,911,041 A | * | 6/1999 | Schaffer | ................ 395/183.14 |
| 6,145,093 A | * | 11/2000 | Shiga | ............................ 714/9 |
| 6,401,220 B1 | * | 6/2002 | Grey et al. | .................... 714/33 |

\* cited by examiner

*Primary Examiner*—Nadeem Iqbal
(74) *Attorney, Agent, or Firm*—Bacon & Thomas, PLLC

(57) ABSTRACT

A method of automatically simulating boosting the items of a windows menu and examining the items including the steps of reading the items of the standard first layer menu from the start menu of a standard windows software and the items of the next layer menu contained therein and then setting up a standard menu architecture subject to the data read, reading the items of the items of the first layer of the start menu of the windows software to be tested and the items of the next layer menu contained therein, setting up a test object menu architecture subject to the data read, and comparing the test object menu architecture with the standard menu architecture so as to judge the correctness of the installation of the windows software to be tested in the computer.

6 Claims, 7 Drawing Sheets

METHOD OF AUTOMATICALLY SIMULATING BOOSTING THE ITEMS OF A WINDOWS MENU AND EXAMINING THE ITEMS

BACKGROUND OF THE INVENTION

The present invention relates to a method of automatically simulating boosting the items of a windows menu of a windows software, in which main and sub menus are boosted and examined automatically.

Windows software (such as WINDOWS operating system designed by MICROSOFT Corporation) is the most convenient computer implement. From the catalog 11 in the start menu 1 of windows software (see FIG. 5), the user can click the mouse to select the desired sub-menu 16 from the items 15 of the main menu 13 in the catalog 11 in the start menu 1 (see FIG. 6), and then to select the desired item 17 from the sub-menu 16 (see FIG. 7), enabling the selected item 17 to be run. The correctness of the items in the main menu 13 and the sub-menu 16 is quite import, and affects the performance of the windows software run by the user. When installing windows software in a computer, the failure of a hardware component part in the computer may cause the main menu and sub-menu of the windows software unable to run normally. According to existing techniques, boosting and examining the items of the main menu and sub-menu must be done manually. During examination, the computer is boosted to read the windows software to be tested, enabling the start menu 1 of the windows software to be displayed on the display screen, and then the mouse is clicked to select all items in the main menu 13 and the sub-menu 16 one after another, enabling every item in the main menu 13 and the sub-menu 16 to be visually checked with reference values. This visual test procedure is complicated, and wastes much time and labor. When the operator gets tired, a human error may occur. Therefore this visual test procedure is of low accuracy, and not suitable for standardization in manufacturing operation.

SUMMARY OF THE INVENTION

The present invention has been accomplished to provide a method of automatically simulating boosting the items of a windows menu of windows software, which eliminates the aforesaid drawbacks. According to the present invention, when installed in a computer installed therein with windows software is turn on, it reads all items contained in the main menu and the sub-menu of the windows software one after another, and then sets up a standard menu architecture, and boosts every item contained in the main menu and the sub-menu and reads the standard menu architecture of the main menu and the sub-menu for comparison with the menu architecture of the windows software under test, and then judges the correctness of the installation of the windows software under test subject to the comparison result. This method enables all items contained in the menus of the windows software installed in the computers under mass-production to be automatically examined.

DETAILED DESCRIPTION OF THE PREFERRED EMBODIMENT

Again referring to FIGS. from 5 through 7, when a computer installed with a windows software is turn on, the CPU of the, computer reads the standard main menu 13 and all contained sub-menus 16 of a standard windows software so as to set up a standard menu architecture, and then boosts the main menu 13 and sub-menu 16 of the windows software to be tested so as to read the menu architecture of the windows software, and then compares the menu architecture of the windows software with the standard menu architecture, and then judges the correctness of the windows software subject to the result of the comparison.

Figure 1:
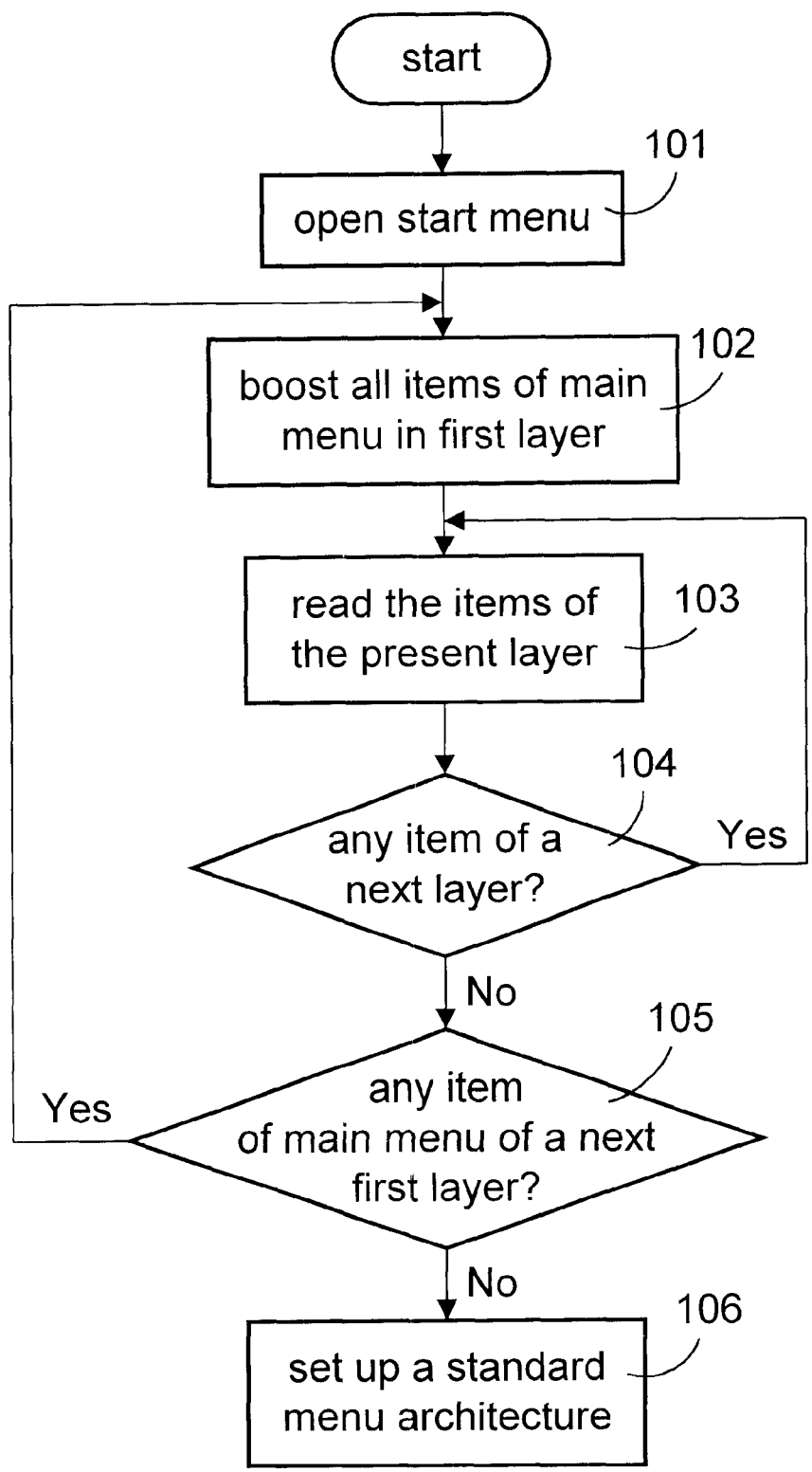
FIG. 1 is a standard menu architecture reading flow chart according to the present invention.
Figure 5:
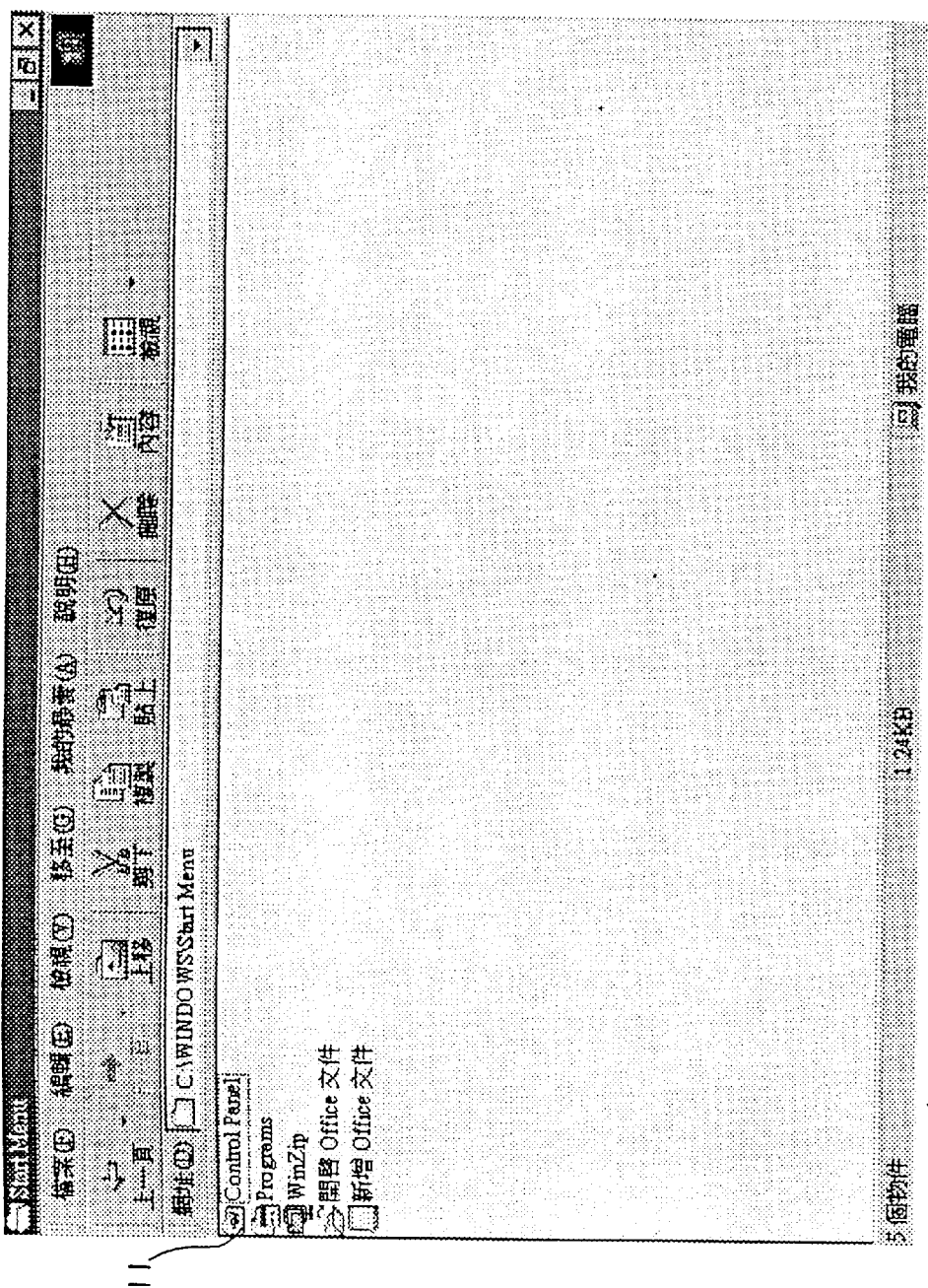
FIG. 5 shows the catalog in the start menu of the windows software according to the present invention.
Figure 6:
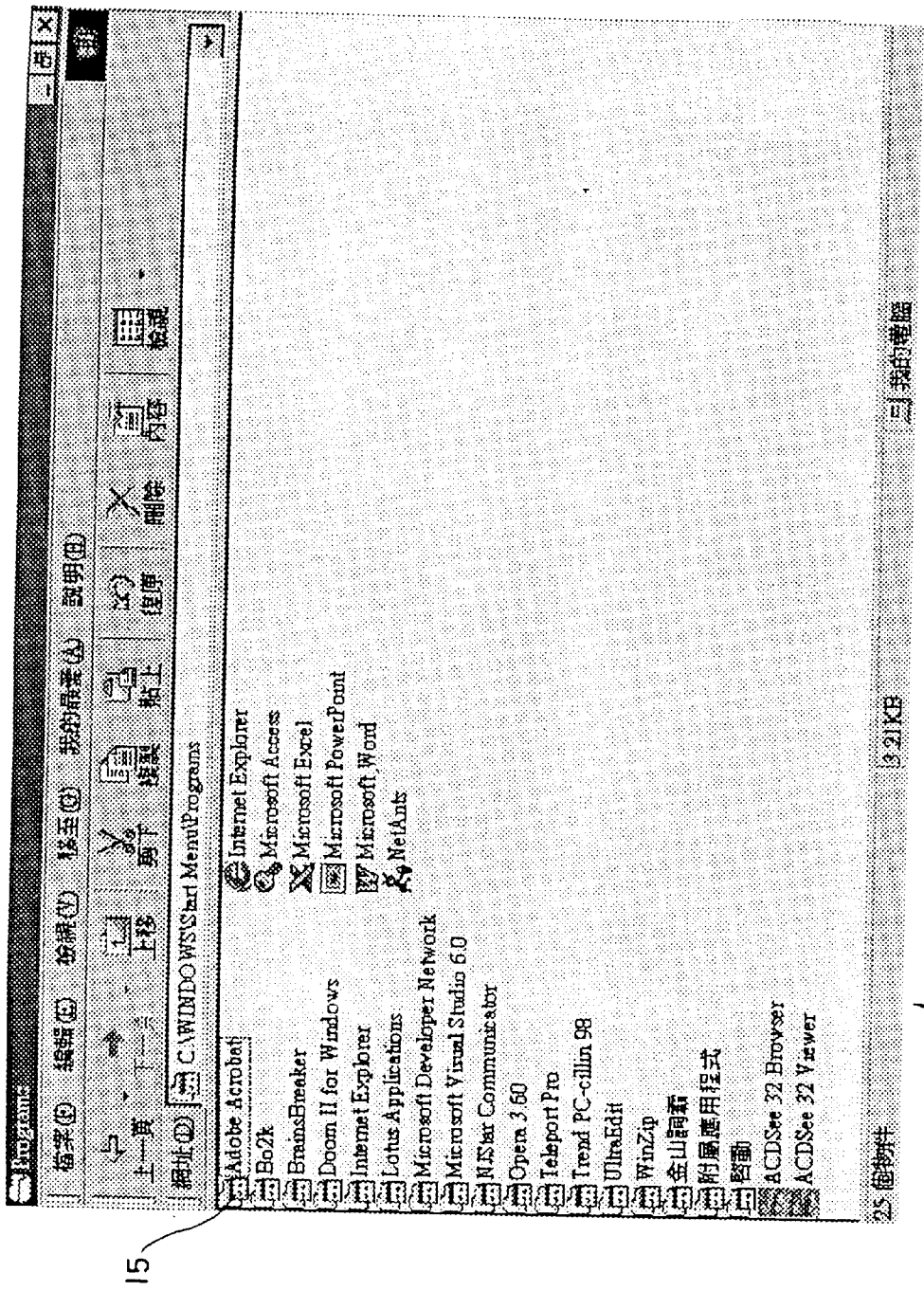
FIG. 6 shows the content of a particular main menu in the start menu according to the present invention.
Figure 7:
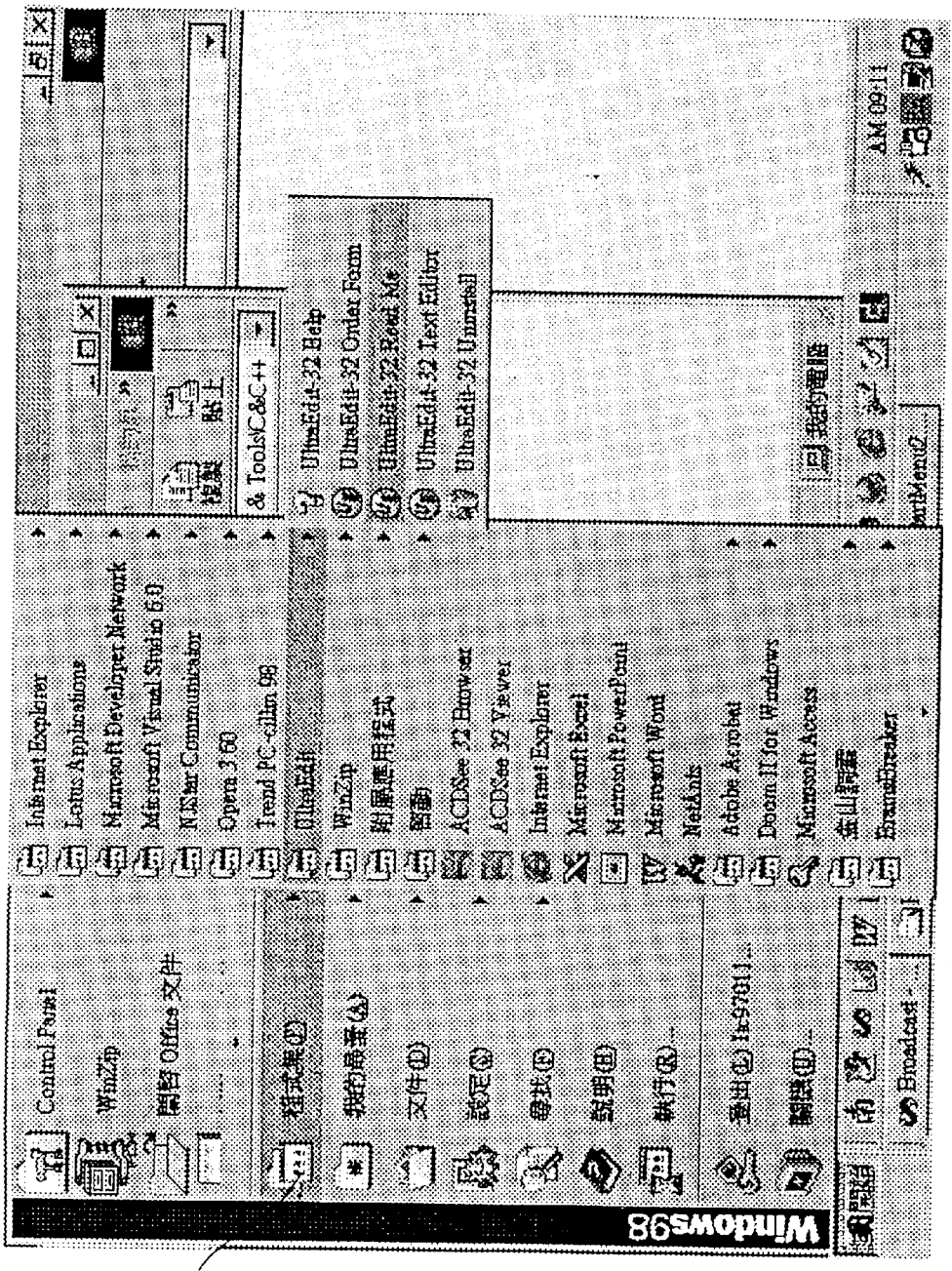
FIG. 7 shows the content of a particularly sub-menu in the main catalog according to the present invention.

Referring to FIG. 1, when the computer is boosted, according to the present invention, it reads the standard windows software, enabling the start menu 1 of the standard windows software to be displayed on the display screen of the computer (see FIGS. 1 and 5) (Step 101), and then it proceeds to Step 102 where the CPU of the computer (not shown) boosts all items of the main menu 13 of the first layer on the start menu 1, and then proceeds to Step 103 where the CPU reads the items of the present layer, and then proceeds to Step 104 where the CPU judges if there is a next layer, so as to return to Step 103 if the result of judgment is positive, or to proceed to Step 105 if the result of the judgment is negative. When entering Step 105, the CPU judges if there is any item of the main menu 13 of the next first layer not been read yet, and then returns to Step 102 if the answer is positive, or proceeds to Step 106 if the answer is negative. When entering Step 106, the CPU sets up a standard menu architecture, and then stores the standard menu architecture in the memory. Thus, the standard menu architecture can be used for comparison with the windows software to be tested, so as to examine the normality of the windows software.

The procedure of reading the menu architecture of the windows software to be examined is outlined hereinafter with reference to FIG. 2. When started, it proceeds to Step 201 where the computer is boosted to read the windows software to be tested, enabling the start menu 1 of the windows software to be displayed on the display screen of the computer, and then it proceeds to Step 202 where the CPU of the computer boosts the main menu 13 at the first layer of the start menu 1, and then it proceeds to Step 203 where the CPU of the computer reads the items of the present layer, and then it proceeds to Step 204 where the CPU of the computer judges if there is a next layer, so as to return to Step 203 and then boost the next layer if the result of judgment is positive, or to proceed to Step 205 if the result of the judgment is negative. When entering Step 205, the CPU judges if there is any item of the main menu 13 of the next first layer not been read yet, and then returns to Step 202 if the answer is positive, or proceeds to Step 206 if the answer is negative. When entering Step 206, the CPU sets up a test object menu architecture, and then stores the test object menu architecture in the memory. After Step 206, it proceeds to Step 207 where the CPU of the computer judges if there is another windows software to be tested and compared with the standard menu architecture, and then returns to Step 201 if the result of the judgment is positive, otherwise, retreats from the procedure.

Figure 2:
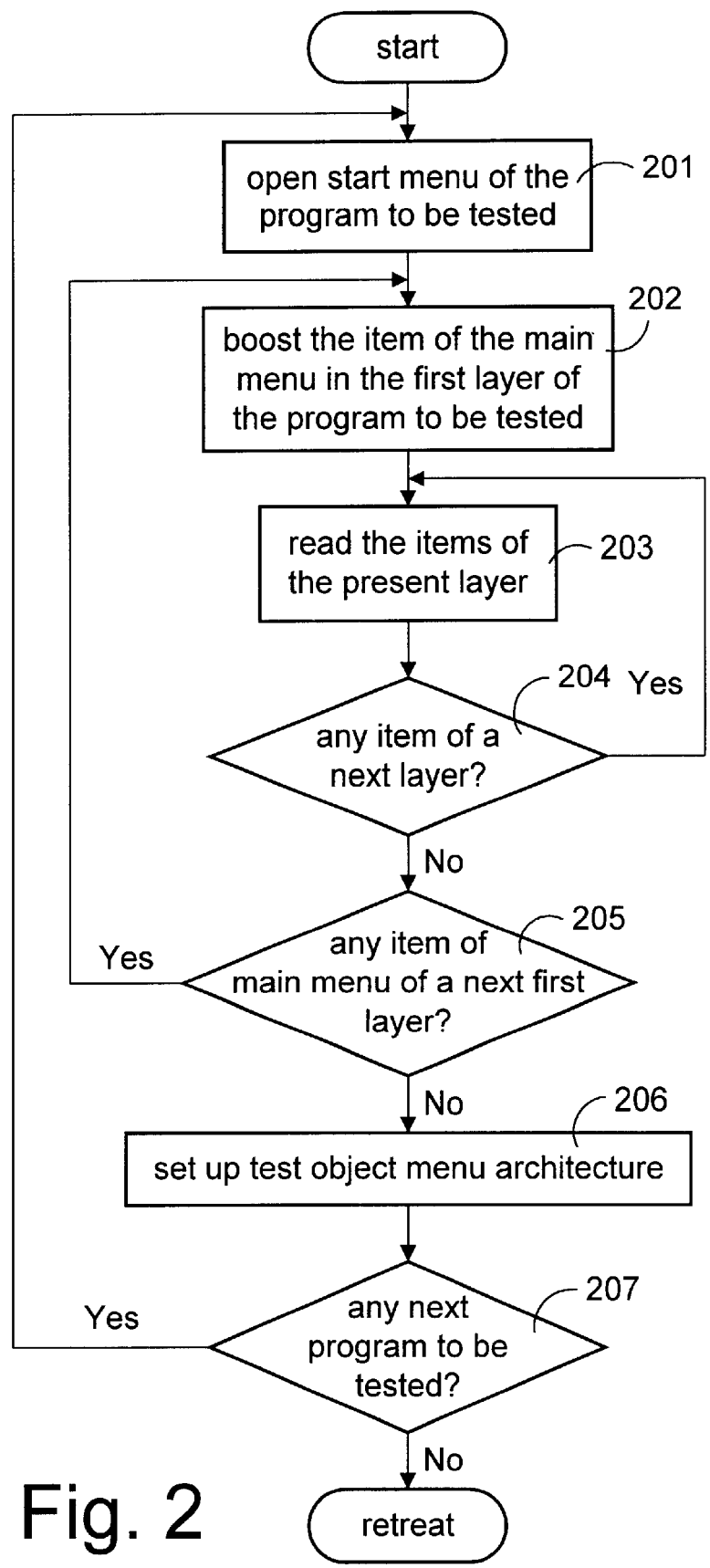
FIG. 2 is a flow chart explaining the procedure of reading the menu architecture of the windows software to be examined.
Figure 3:
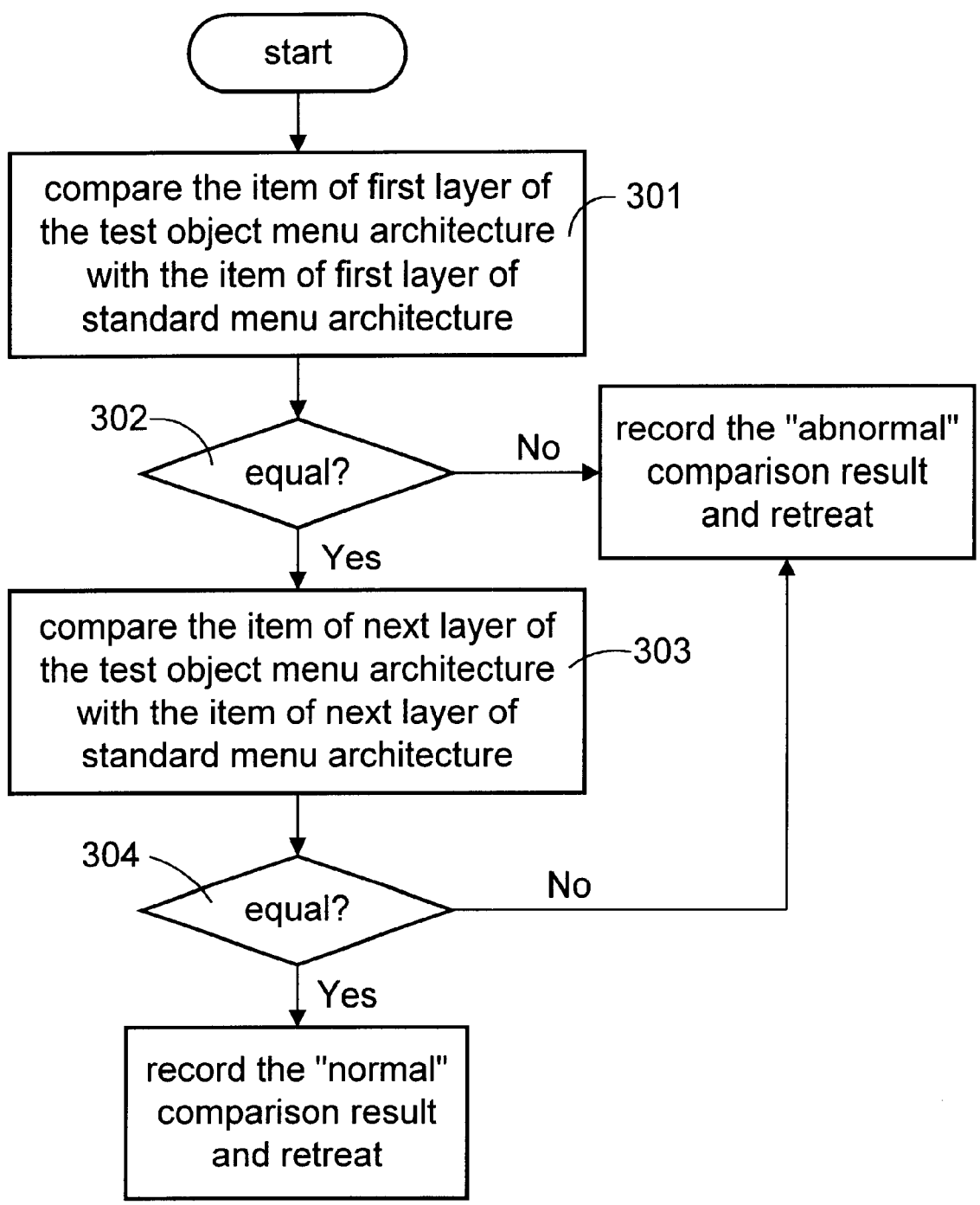
FIG. 3 is an operational comparison flow chart according to the present invention.

After the procedure shown in FIG. 2, it enters the procedure shown in FIG. 3. When started, it proceeds to Step 301 where the CPU fetches the test subject menu architecture and the standard menu architecture from the memory, then compares the items in the first layer of the test subject menu architecture with the items in the first layer of the standard menu architecture, and then proceeds to Step 302 judging if the items in the first layer of the test subject menu architecture are equal to the items in the first layer of the standard menu architecture, and records the comparison result as incorrect and then retreats from the procedure if the answer is negative. Otherwise, it proceeds to Step 303 where the CPU compares the items of the next layer of the test object menu architecture with the items of the next layer of the standard menu architecture, and then proceeds to Step 304 judging if the items in the next layer of the test subject menu architecture are equal to the items in the next layer of the standard menu architecture, and records the comparison result as incorrect and then retreats from the procedure if the answer is negative. Otherwise, it records the comparison result as correct and then retreats from the procedure.

Figure 4:
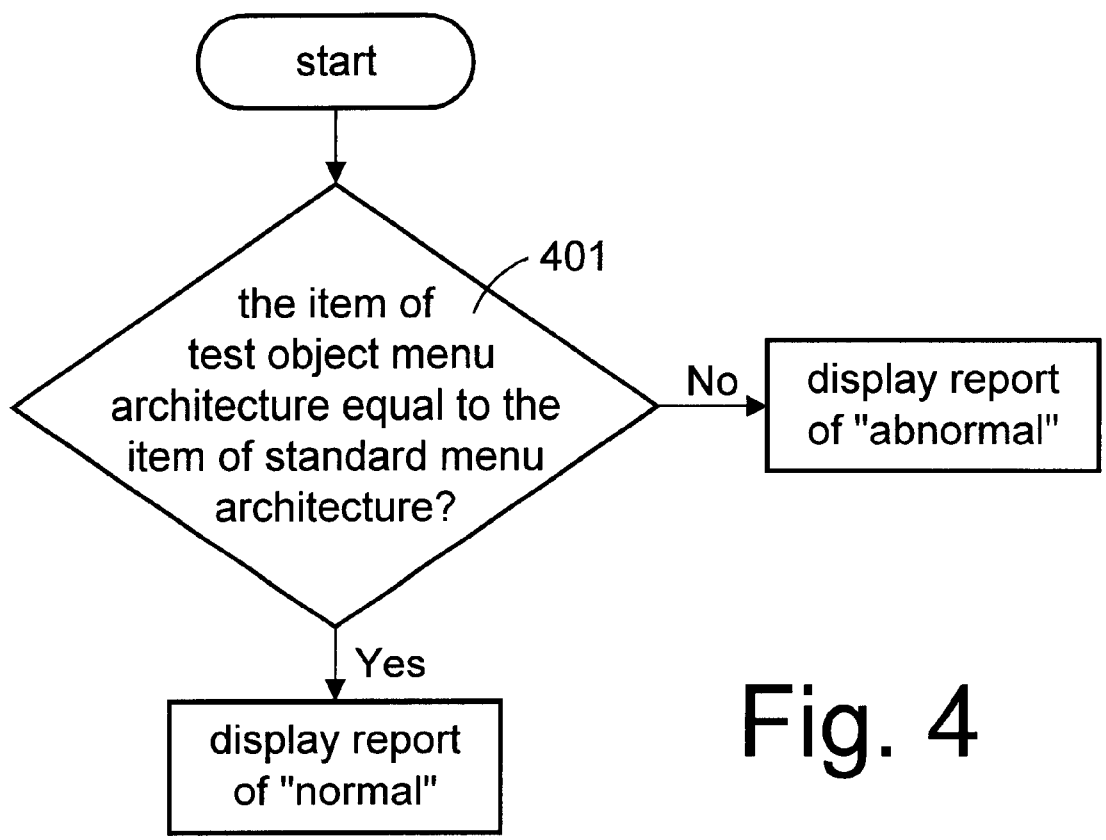
FIG. 4 is a comparison result judgment flow chart according to the present invention.

After the procedure shown in FIG. 3, it enters the procedure shown in FIG. 4. When started, it proceeds to Step 401 where the CPU judges if the catalogs of the first layer and next layer of the test object menu architecture are equal to the catalogs of the first layer and next layer of the standard menu architecture, and then shows normal through the monitor or printer if the result is judged to be correct, or shows abnormal through the monitor or printer if the result is judged to be incorrect.

It is to be understood that the drawings are designed for purposes of illustration only, and are not intended as a definition of the limits and scope of the invention disclosed.

What the invention claimed is:

1. A method of automatically simulating boosting the items of a windows menu and examining the items comprising the steps of:

reading the items of the first layer menu from the start menu of a standard windows software and the items of the next layer menu contained therein and then setting up a standard menu architecture subject to the data read;

reading the items of the first layer of the start menu of a windows software to be tested and the items of the next layer menu contained therein and then setting up a test object menu architecture subject to the data read;

comparing said test object menu architecture with said standard menu architecture so as to judge the correctness of the installation of the windows software to be tested in a computer.

2. The method of claim 1 wherein when said standard windows software being read and the start menu of said standard windows software being shown on the display screen of a computer further comprising the steps of:

boosting the item of the first layer main menu of the start menu of said standard windows software and reading the item of the present layer;

judging if there is any next layer in the item not read, and then boosting the item of the next layer and reading the item so as to set up said standard menu architecture after all items have been read.

3. The method of claim 1 wherein when the windows software to be tested being read and the start menu of the windows software being shown on the display screen of a computer further the step:

boosting the item of the first layer main menu of the start menu of said windows software and reading the item of the present layer;

judging if there is any next layer in the item not read, and then boosting the item of the next layer and reading the item so as to set up said test object menu architecture after. all items have been read.

4. The method of claim 1 wherein further comprising the steps of:

comparing the items of said test object menu architecture with the items of said standard menu architecture;

making judgment subject to the equality of the items of said test object menu architecture relative to the items of said standard menu architecture, and then recording the comparison result.

5. The method of claim 4 wherein the record of the comparison result may be output to a display means.

6. The method of claim 4 wherein the record of the comparison result may be output to a printer.

* * * * *